Sept. 14, 1926.  M. SURJANINOFF  1,600,149
WATER TIGHT BEARING
Filed Feb. 11, 1926
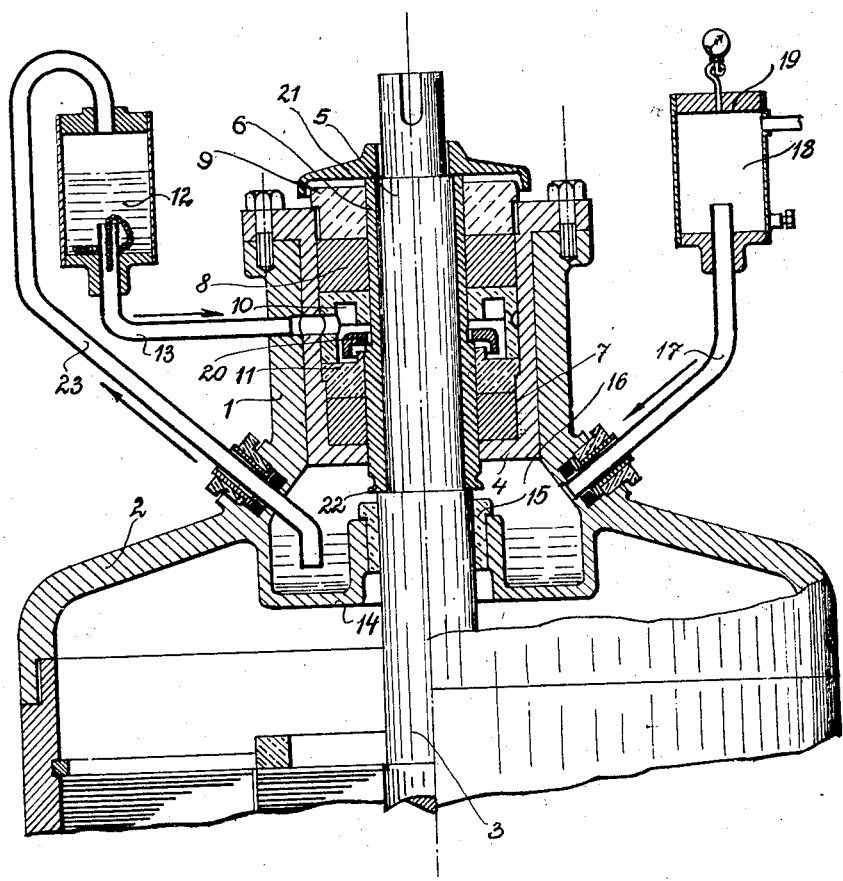

Patented Sept. 14, 1926.

1,600,149

UNITED STATES PATENT OFFICE.

MICHAEL SURJANINOFF, OF VIENNA, AUSTRIA.

WATER-TIGHT BEARING.

Application filed February 11, 1926, Serial No. 87,488, and in Germany June 5, 1924.

The invention relates to bearings of such kind in which the casing enclosing the bearing is supplied with a gaseous means under pressure which is forced outwardly between the bushes and carries with it particles of the lubricant which is supplied to the shaft. The aim of such construction is to prevent water from entering from the outside into the bearing if the machine having such a bearing has to work under water.

The object of the present invention is to provide an improved water tight bearing by disposing the inlet of the lubricant in the bearing at a higher level than the inlet of the gaseous pressure means employed, preferably providing a small chamber separating the said inlets each from the other, in which chamber the gas under pressure and the lubricant are caused to mix.

Further details will be described with reference to the annexed drawing which illustrates an embodiment of the invention in an axial section.

1 is the tubular extension of a casing 2 of a motor having a shaft 3. 4 is a stuffing box tightly fitted into the said tubular extension 1. 5 is the pivot having fixed thereon a sleeve 6. Between the sleeve 6 and the inner side of the stuffing box are mounted the packings 7, 8, which are compressed by means of the screw ring 9. Embedded in the packings 7, 8 is a ring 10 having a recess or chamber, the under-side of which is closed by a ring 11. Rings 9, 10 and 11 are of metal and serve as bearings for the shaft.

12 is a receptacle for the supply of the lubricant and 13 a tube connecting the receptacle 12 with the recess or chamber of the ring 10. The lubricant flows first in the recess of the ring 10 and then comes into contact with the circumference of the sleeve 6 fixed on the pivot of the shaft 3.

Below the tubular extension 1, the case 2 is provided with a partition 14, having a central opening through which the shaft 3 passes, a guiding sleeve 15 being arranged in this opening. This partition 14 forms the bottom of a closed chamber 16 below the stuffing box. 17 is the supply tube for the gas under pressure and merges into the chamber 16. In the example shown, the tube 17 is connected to a vessel 18, in which air is put under appropriate pressure.

The supplied air under pressure tends to flow upwardly into the small space between the packings 7, 8 and the circumference of the sleeve into free air thereby preventing the lubricant which in outflowing from the recess of the ring 10 has penetrated the said space, from flowing downwardly. In the recess of the ring 10 mixing of the air with the lubricant may take place, the outflowing air thereby carrying part of the lubricant with it upwardly. In the recess of the ring 10 a cup shaped ring 20 may be arranged, leaving below a narrow gap for the entrance of air into the recess, this air being forced to mix itself with oil, coming from pipe 13, without the possibility of escaping upwards directly.

To the upper end of the sleeve 6 is secured a cap 21, between the underside of which and the upper side of the screw ring 9, there is only a narrow gap for the escape of the compressed air which has flown upwardly. This cap serves to prevent the entrance of dirt between the sliding surfaces of the bearing.

Any lubricant which has flown downwardly from the recess of the ring 10 against the action of the compressed gas is removed by centrifugal force from the lip 22 of the sleeve 6 and is collected at the bottom of the chamber 16. In this way the lubricant is prevented from entering the motor casing 2 by passing between the sleeve 15 and the shaft 3. The lower part of the chamber 16 is connected by means of a small tube 23 with the upper part of the receptacle 12 for the supply of lubricant, so that the lubricant recollected in the chamber 16 may be conveyed back to the receptacle 12 by temporarily increasing the pressure of the air.

When the motor is not running the greater part of the gaseous pressure means is collected in the upper part of the recess of the ring 10 and presses onto the lubricant present in this recess; the lubricant being thereby caused to fill up all interstices to which it may penetrate, the result thereof being that the escape of the pressure means is rendered more difficult.

Therefore during the time of rest of the motor next to nothing of pressure gas escapes.

The purpose of the employment of the sleeve 6 put on the pivot 5 is the following; experience has shown that the necessary quantity of lubricant and pressure gas with such kind of bearings varies with the circumferential speed of the pivot.

In order to have with different machines approximately the same conditions and to enable the use of always the same packing material and the same constructional elements, a sleeve 6 of a determined outer diameter is shifted onto the pivot after having machined the bore thereof so as to perfectly fit the pivot. The stuffing box together with its accessories can therefore be built as a unitary standard construction, which can be employed for pivots of different diameters, by only boring the sleeve 6 according to the special pivot. The circumferential speed of the pivot will then be in most cases nearly the same and the conditions of tightening will also be practically unvaried.

The stuffing box 4 is mounted as an individual body in the tubular extension 1 so that this stuffing box with the sleeve 6 mounted therein can be completely packed and controlled for its tightness prior to its insertion into the tubular extension 1 of the casing 2. Of course also the stuffing box has to be tightly fitted into the tubular extension 1 and any required adjustment of the stuffing box 4 together with the sleeve 6 in relation to the pivot 5 may be made.

As the gas under pressure passes the gap between the guide ring 15 and the shaft 3, the interior of the motor casing 2 is always filled with this gas.

What I claim is:

1. In a watertight bearing for the shaft of a machine enclosed within a casing as set forth, the combination of a stuffing-box for the said casing, this box surrounding the shaft, bearing-rings within the stuffing-box, a ring embedded in the said stuffing-box and having a recess forming a chamber open against the shaft, a receptacle for a lubricant, a tube connecting the lower part of the receptacle with the recess of the said embedded ring, a chamber situated at the inner end of the said stuffing-box within the casing, an inlet for a gaseous medium under pressure, this second named inlet discharging into the upper part of the said chamber, a tube connecting the lower part of the said chamber with the upper part of the said lubricant-receptacle, means for supplying the gaseous medium under pressure acting continuously regardless of the fact whether or not the machine is running.

2. In a watertight bearing for the shaft of a machine enclosed within a casing as set forth, the combination of a stuffing-box for the said casing, this box surrounding the shaft, bearing-rings within the stuffing-box, a ring being embedded in the said box and having a recess forming a chamber open against the shaft, a receptacle for a lubricant, a tube connecting the lower part of the said receptacle with the recess of the said embedded ring, a chamber situated at the inner end of the said stuffing-box within the casing, an inlet for a gaseous medium under pressure, discharging into the upper part of the second named chamber, a tube connecting the lower part of this chamber with the upper part of the said lubricant-receptacle, means for supplying the said chamber with the gaseous medium under pressure acting continuously regardless of the fact whether or not the machine is running, and a sleeve mounted upon the shaft-pivot within the stuffing-box, this sleeve extending towards the said chamber and being provided with a circular projection for hurling lubricant into the chamber.

In testimony whereof I affix my signature.

MICHAEL SURJANINOFF.